United States Patent [19]

Brady et al.

[11] 4,285,084
[45] Aug. 25, 1981

[54] METHOD AND APPARATUS FOR MAKING LOCK WASHERS

[75] Inventors: Joseph M. Brady, Pennsauken; Harold S. Peterson, Medford Lakes, both of N.J.

[73] Assignee: MSL Industries, Inc., Lincolnwood, Ill.

[21] Appl. No.: 22,958

[22] Filed: Mar. 23, 1979

[51] Int. Cl.³ .............................................. B21D 53/20
[52] U.S. Cl. ....................................... 10/73; 10/86 B; 72/132; 72/143; 72/145; 83/354; 83/355; 83/907; 140/88
[58] Field of Search ................... 10/73, 86 B; 72/132, 72/140, 142, 143, 145; 140/88; 83/907, 298, 349, 354, 355

[56] References Cited

U.S. PATENT DOCUMENTS

| | | | |
|---|---|---|---|
| 1,745,160 | 1/1930 | Garrett | 10/73 |
| 1,967,559 | 7/1934 | Schreck | 83/298 |
| 2,160,497 | 5/1939 | Garrett | 10/73 |
| 4,136,591 | 1/1979 | Helm et al. | 83/355 |

Primary Examiner—Carl E. Hall
Attorney, Agent, or Firm—Dressler, Goldsmith, Shore, Sutker & Milnamow, Ltd.

[57] ABSTRACT

A method and apparatus for making split lock washers consists of an automated machine wherein the diameter and gap of a lock washer can be accurately controlled. The apparatus includes a drive mechanism for driving the cutter and a transmission unit driven by the drive mechanism which can be adjusted to correlate the feed speed of the wire with the cutter to produce washers of different diameters. After the correlation speed has been set the production speed can be increased or decreased and the synchronized relation of the feed and cutter speeds will remain the same.

17 Claims, 9 Drawing Figures

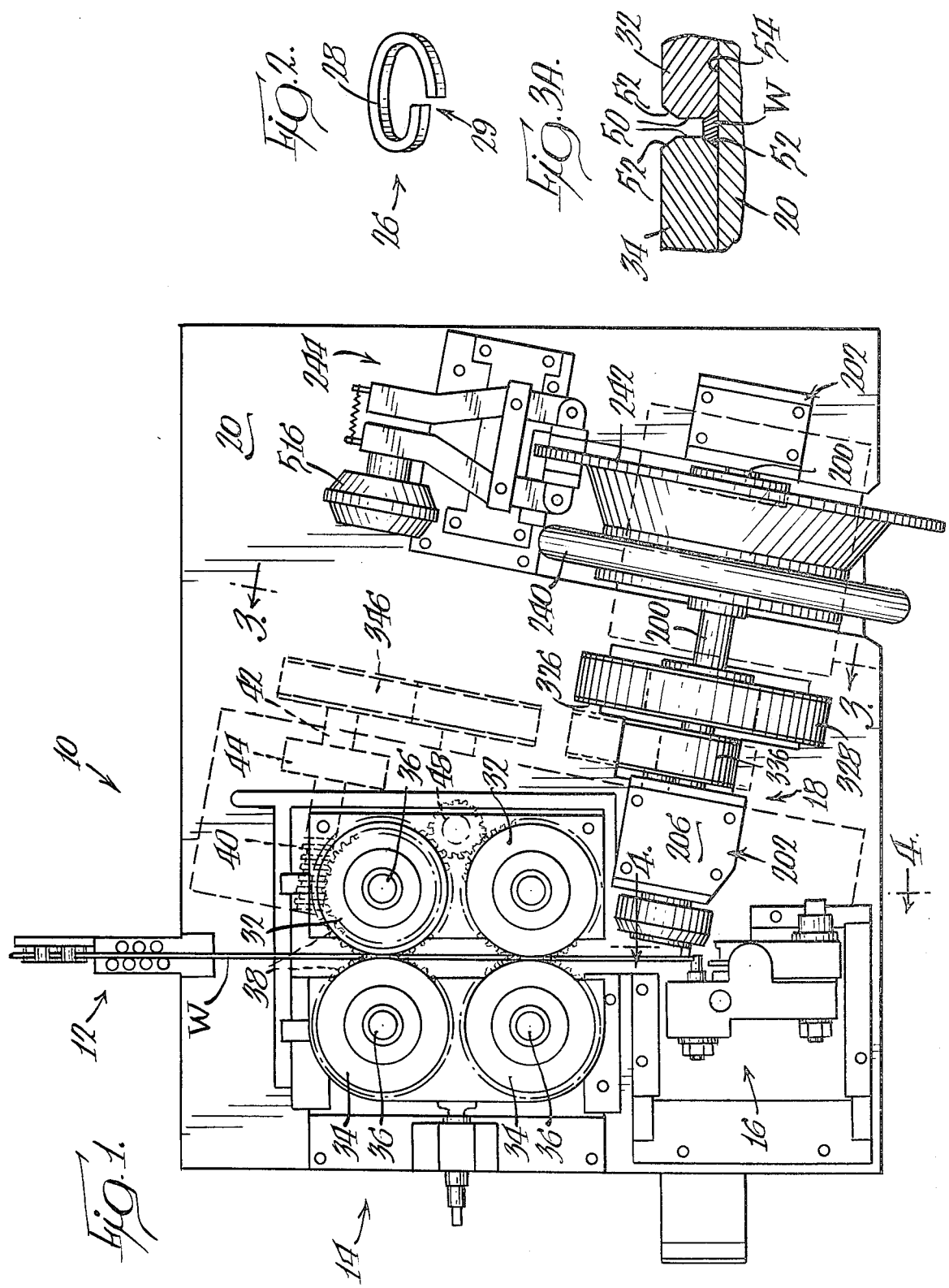

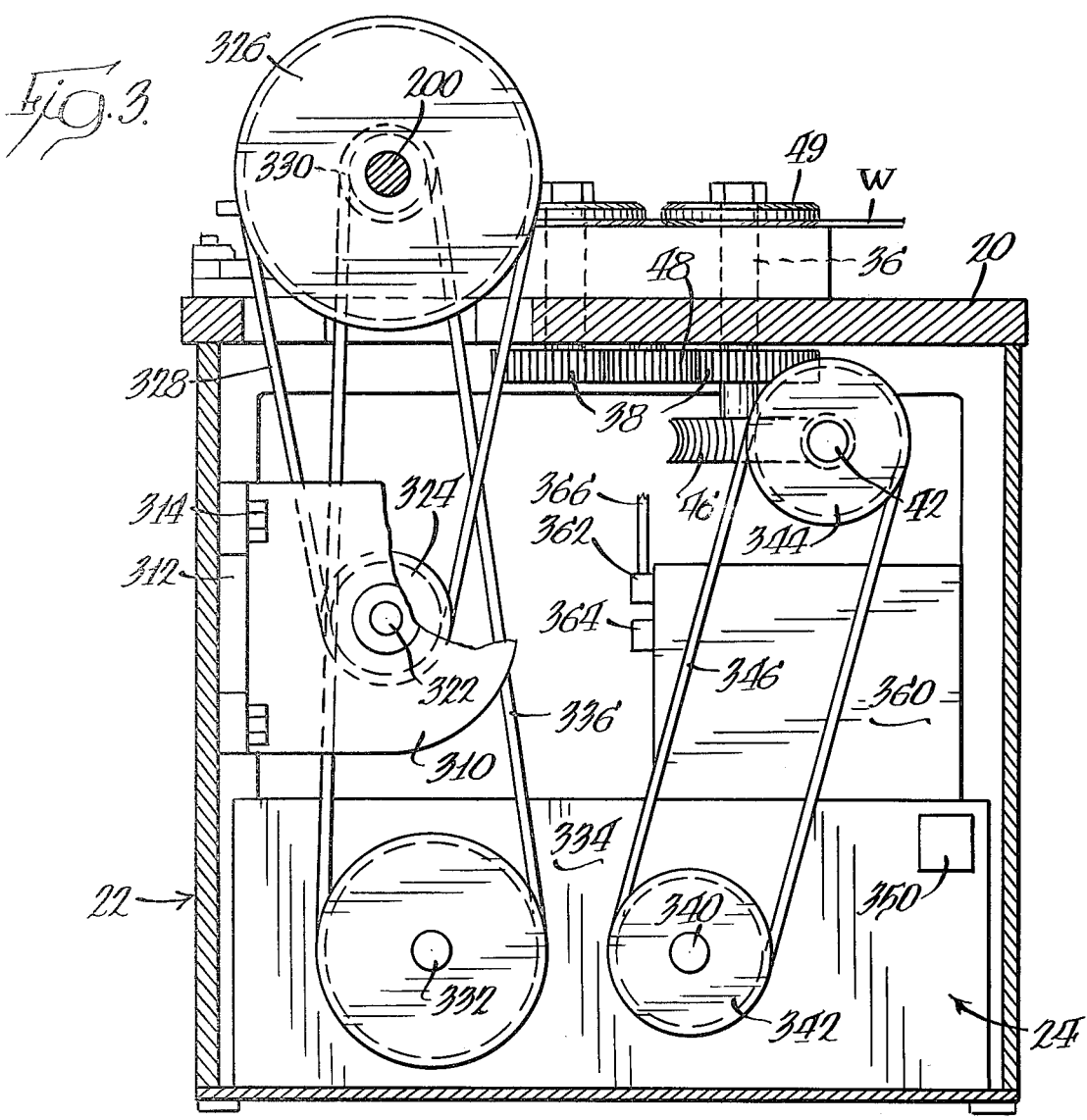
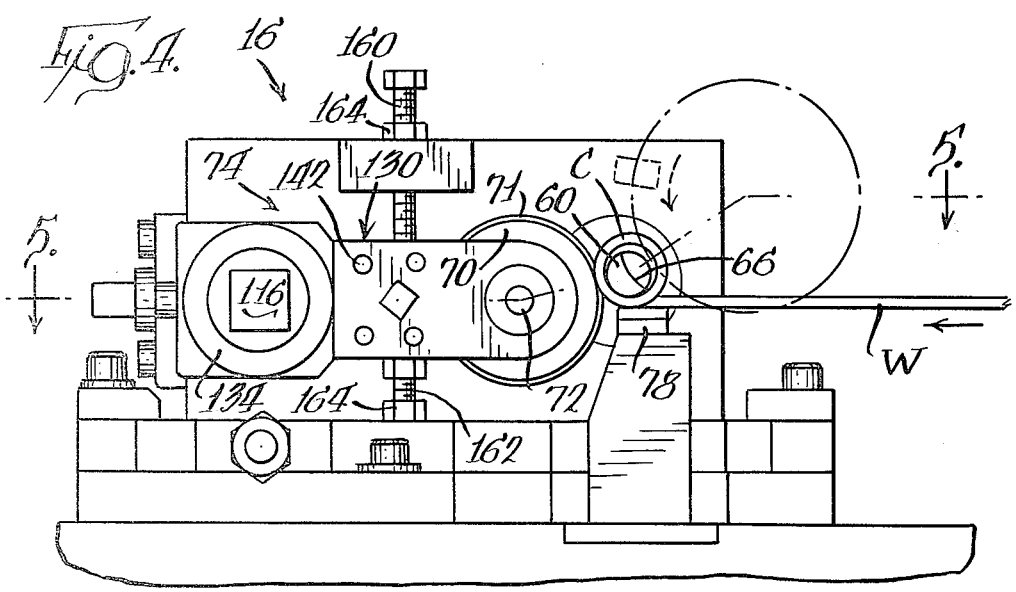

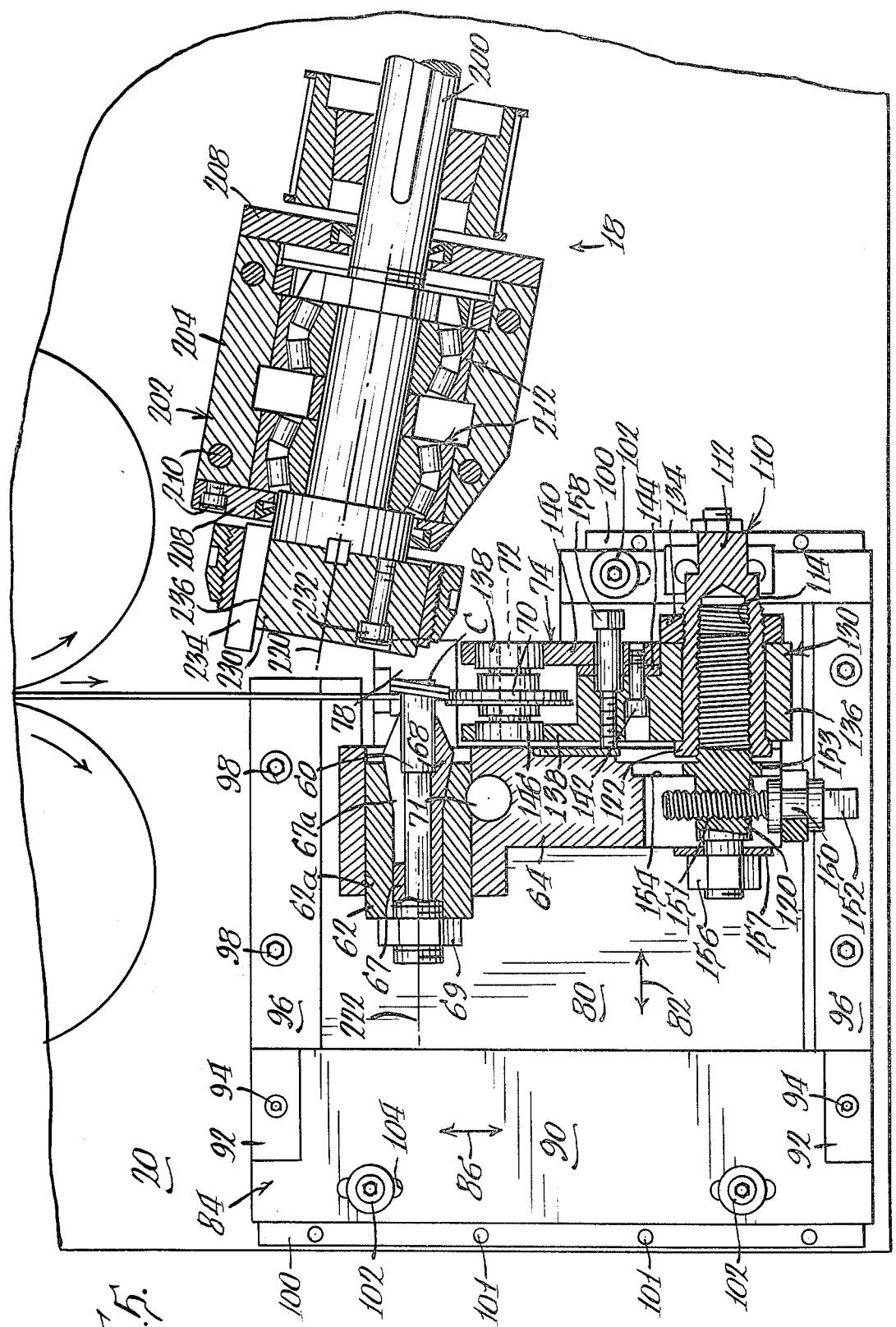

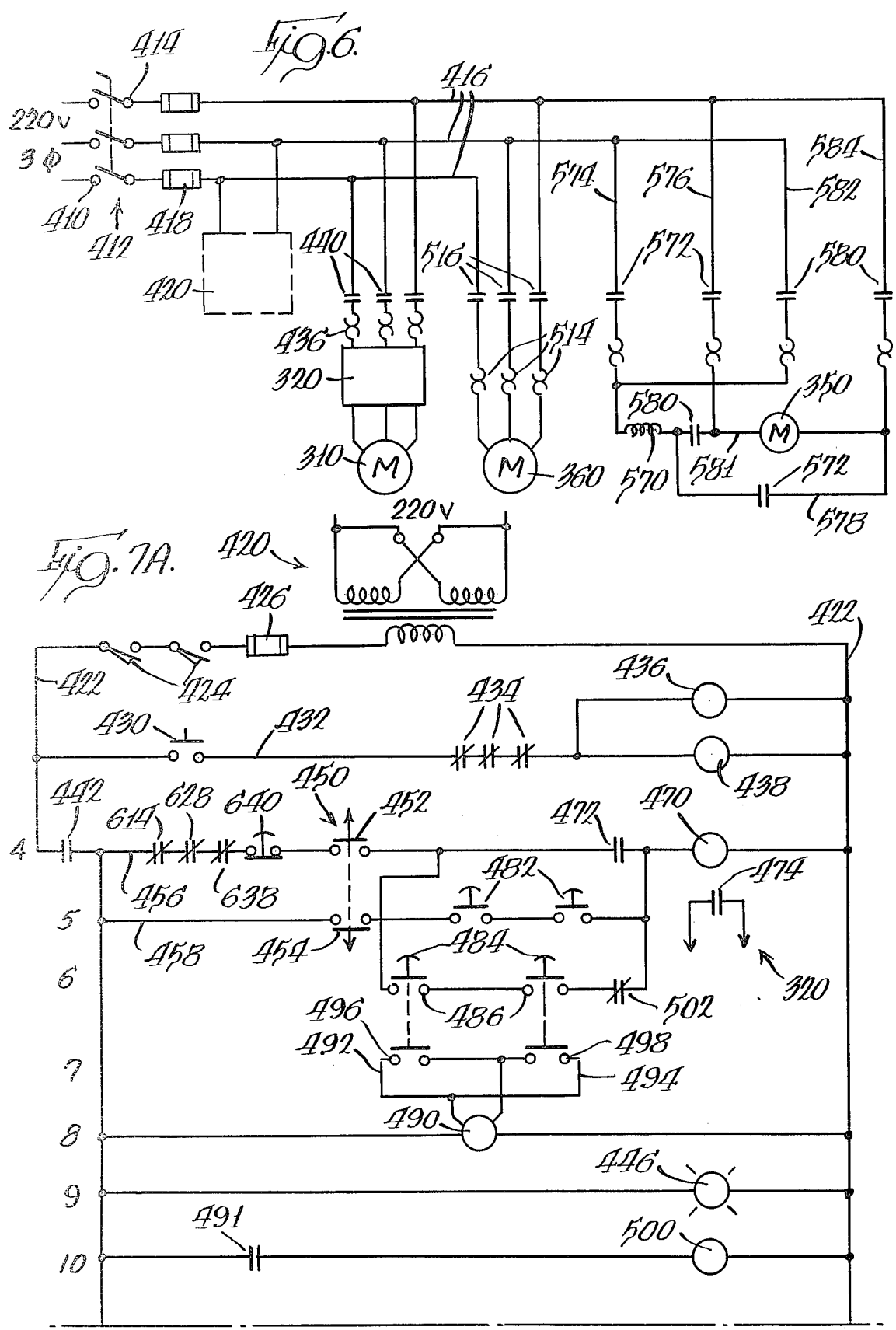

METHOD AND APPARATUS FOR MAKING LOCK WASHERS

DESCRIPTION

1. Technical Field

The present invention relates generally to lock washers of the split and resilient spring type. More specifically, the present invention is directed to an improved method and apparatus for making lock washers in an automatic and entirely continuous manner from a continuous supply of wire.

2. Background Art

Numerous method and apparatus have been proposed and are presently being utilized for forming various types of split ring type lock washers and examples of these are disclosed in the following U.S. Pat. Nos.

1,560,228
1,745,160
1,856,806
1,989,750
2,160,497
2,247,981
2,249,113
2,308,579
1,882,100
3,086,228
3,461,471
3,902,209

One of the most difficult problems that has been encountered in making automated machinery for producing split ring type lock washers is to design a machine that can be readily varied to be able to produce different sizes of lock washers either from material having different thicknesses or having different internal diameters. One of the most successful machines that has been utilized for many years for producing lock washers of different diameters is disclosed in U.S. Pat. Nos. 1,745,160 and 2,160,497. The first of these patents discloses an automated machine which is capable of continuously coiling a flat stock of wire into a helical coil and severing the end convolutions to produce a split ring lock washer. This patent also discloses a manner in which lock washers of different internal diameters can be produced from the same machine by replacement of some components on the machine. In order to change sizes of lock washers and/or produce lock washers having different radial thicknesses, it is necessary to remove one set of intermeshing gears and replace this set with a further set of gears so that the speed ratio of the wire feed device is correlated with the speed of the cutting device.

Another problem that has been encountered is to accurately control the gap that exists between the free spaced ends of the split ring lock washer. In the machine disclosed in the first patent discussed above, this is achieved by varying the relationship of the intermeshing gears, i.e., having only partial intermeshing of the respective teeth of adjacent intermeshing gears. Because of the critical nature of adjustment in producing an accurate relationship between the internal diameter of the lock washer and the gap spacing, the manner of adjusting this type of machine has become an "art" and the number of artisans that can perform such function has rapidly reduced in number.

SUMMARY OF THE INVENTION

According to the present invention, a method and apparatus has been developed which eliminates the time consuming change heretofore necessary for converting from one diameter size of lock washer to another and also eliminates the dependence upon skilled artisans for making the necessary accurate adjustments to produce a split ring lock washer having an accurately controlled internal diameter as well as an accurately controlled gap between the free ends of the split ring.

In its broadest aspect, the method of the present invention contemplates continuously feeding a straightened wire towards a coiling device to transform the wire into a helical coil and continuously rortating a cutter to sever end convolutions of the coil. A variable transmission unit is interposed between the drive mechanism for the rotating cutter and the feed rolls that feed the straight wire and the transmission unit is utilized to coordinate the feed speed of the wire with the rotational speed of the cutter to produce a given lock washer diameter having a predetermined gap.

According to one aspect of the invention, after the speed of the feed rolls has been coordinated with the rotational speed of the cutter, the speed of the cutter can be increased and decreased to vary the output of the machine and the variable transmission unit will maintain a synchronized relation between the feed roll and cutter speeds.

More specifically, in the specific method of the present invention, the cutter is supported eccentrically of the center of a cutter head which is supported on a shaft that is rotated about a fixed axis on a support and is driven by a variable speed motor. The feed rolls are driven by the shaft through the variable transmission unit to feed the wire along a path towards the coiling device which produces a helical coil that has its axis slightly angularly offset with respect to the axis of the cutter supporting shaft to produce a more square cut with respect to the helical coil.

The specific and unique drive mechanism includes an electric motor that is driven by an alternating current, fixed voltage source with a speed control located between the motor and the source to adjust the voltage and frequency of the source and, thereby, change the speed of the drive motor. The output of the drive motor is connected to the cutter supporting shaft through a timing belt and the shaft in turn is connected to the input of the variable transmission unit through a further timing belt while the output of the variable transmission unit is connected through an additional belt to intermeshing gears that drive at least one pair of feed rolls. This arrangement insures that there is perfect synchronization between the rotational speed of the cutter and the feed speed of the wire after appropriate adjustments have been made for producing a given size diameter lock washer with a predetermined gap so that the speed of the system can be increased and decreased without affecting the diameter and gap of the lock washers that are being produced.

According to a further aspect of the invention, the cutter supporting shaft remains in a fixed position at all times on the horizontal support and all of the remaining elements, particularly the coiling device, are substantially universally adjustable with respect to the end of the shaft to readily vary the respective spacings and, thereby, accommodate different thicknesses of wire, which is normally keystone shaped in cross section.

BRIEF DESCRIPTION OF THE SEVERAL VIEWS OF THE DRAWINGS

FIG. 1 is a plan view of a lock washer making machine having the features of the present invention incorporated therein;

FIG. 2 is a perspective view of a finished washer capable of being produced by the machine illustrated in FIG. 1;

FIG. 3 is a sectional view as viewed generally along line 3—3 of FIG. 1;

FIG. 3A, appearing with FIG. 2, is a partial cross-sectional view of the wire feed device;

FIG. 4 is a fragmentary view as viewed along line 4—4 of FIG. 1;

FIG. 5 is an enlarged sectional view as viewed generally along line 5—5 of FIG. 4; and FIGS. 6, 7A and 7B schematically illustrate the electric circuit for operating the various components of the lock washer making machine illustrated in FIG. 1.

DETAILED DESCRIPTION

Figure 7B:
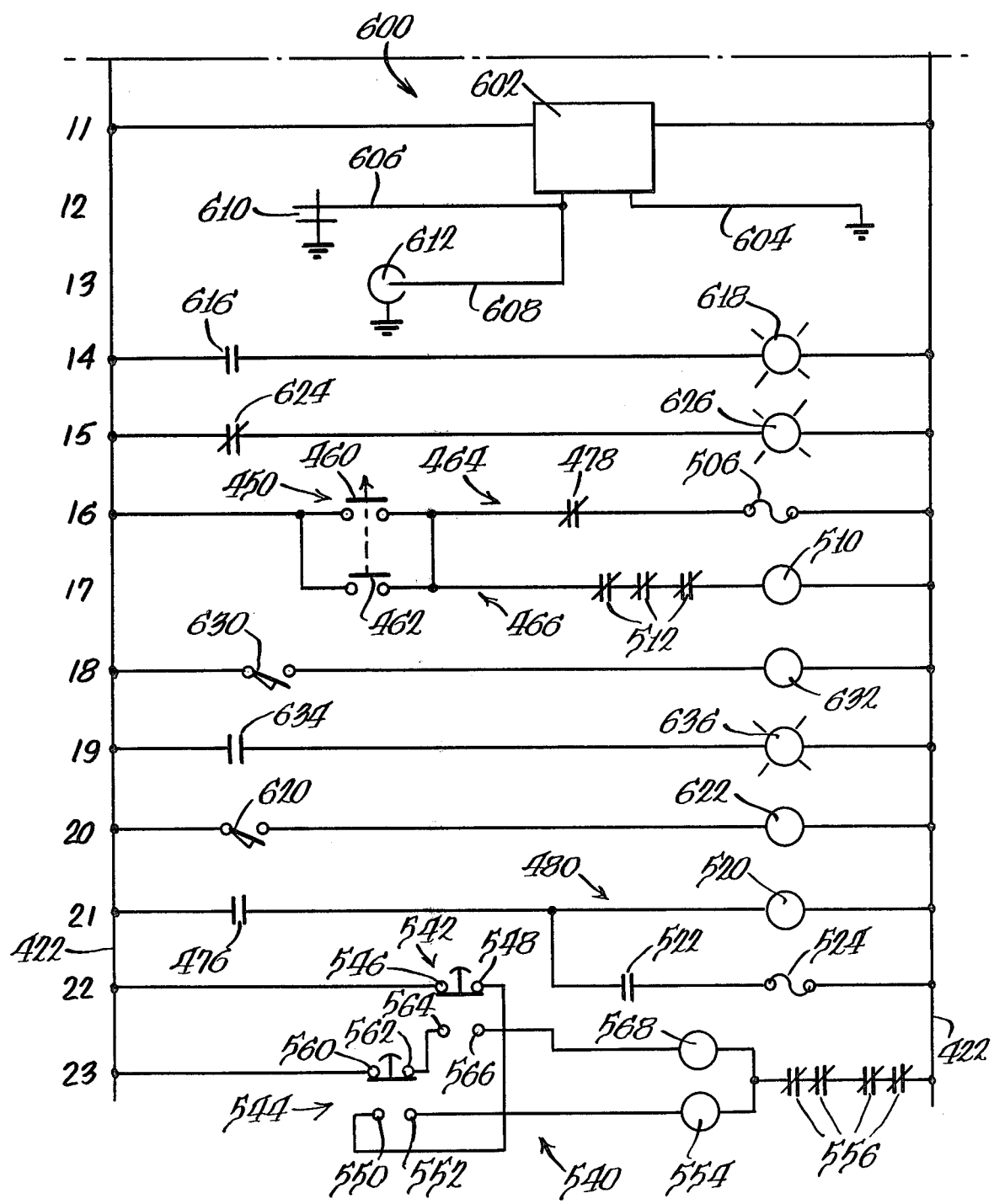

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

GENERAL CONSTRUCTION

FIG. 1 is the drawings discloses a lock washer making machine generally designated by reference numeral 10 which consists of a wire straightening device 12, a wire feed device 14, a coiling device 16 and a cutting device 18. All of these components are supported on a platform 20 which forms part of a housing 22 that encloses a drive mechanism 24, which will be described in more detail later.

Lock washer making machine 10 is specifically designed for making split ring type lock washers, one of which is illustrated at 26 in FIG. 2, and includes a coiled piece of wire 28 that is split at 29 to produce a gap, which will be referred to in subsequent discussions.

WIRE FEED

A continuous supply of wire W is fed from a coil (not shown) through straightening device 12, which may be of a commercially available type sold by Durant Tool Company. The straightened wire is fed between a plurality of cooperating rolls 32 and 34 with two spaced pairs being shown in the drawings. Each roll 32 is supported on the upper end of a stub shaft 36 (FIG. 3), the lower ends of which have gears 38. Positive drive roll 32 is driven through a worm gear 40 (FIG. 1) supported on one end of an idler shaft 42 which is rotatable in a support bearing 44. Worm gear 40 is in mesh with a further gear 46 (FIG. 3) on the lower end of one shaft 36 and idler shaft 42 is driven by drive means that will be described in more detail later.

Gears 38 of the first drive rolls 32 of the two pairs have an idler gear 48 in mesh therewith so that both drive rolls 32 are positively driven from a single power source, as will be described later.

Rolls 34 are idler rolls which are adjustable toward and away from fixed drive rolls 32 to accommodate different wire diameters and to vary the pressure applied to the wire by the feed rolls 32 and 34.

Rollers 32 and 34 are designed to be reversible to increase the life thereof and to provide extended contact with the surfaces of the keystone shaped wire. As illustrated in FIG. 3A, the peripheral surface of each roll 32, 34 has a flat surface 50 and a tapered surface 52 leading from each edge of flat surface 50. Each tapered surface has an angle equal to the taper of the keystone wire W to provide extended surface contact.

With the double tapered surfaces 52, the life of rolls 32, 34 can be doubled by merely flipping the rolls when the first surface 52 becomes damaged and use the second surface of the roll. In either event, wire W is trapped between surfaces 52 and a supporting surface 54 defined on platform 20. Of course, the angle of tapered surfaces is substantially exaggerated for purpose of illustration only and is preferably on the order of $3\frac{1}{2}$ degrees.

COILING DEVICE

The details of the coiling device 16 are illustrated in FIGS. 4 and 5 and consist of an arbor 60 (FIG. 5) supported by a sleeve 62 on a movable support 64 that is mounted on base 20 in a manner that will be described later. The outer free end of arbor 60 has a cutout portion 66 (FIG. 4) to define a recess that cooperates with a cutter in the manner to be described later.

More specifically, sleeve 62 has a circular opening 62a that has its center eccentric to the center of the circular periphery thereof and receives a tubular member 67 that has an enlarged taper 68 at one end thereof. The arbor 60 has an enlarged portion 60a at one end and a reduced portion at the opposite end received into the opening in tubular member 67, which has a slot 67a extending from one end. Sleeve 62, tubular member 67 and arbor 60 are releasably retained as a unit by a nut 69.

Coiling device 16 also has a coil forming roll 70 that cooperates with arbor 60 to transform the straight piece of wire W into a helical coil. Forming roll 70 having a pin 72 secured thereto, which is freely rotatable on a movable support structure 74, as will be described later, also has a flange 76 extending from one edge to guide the wire W around arbor 60.

Coiling device 16 also has an anvil 78 which is located directly below the peripheral surface of arbor 60 to define a restricted path for wire W so that the continuously moving wire will be formed into a helical coil, as illustrated in FIG. 5.

With this arrangement, arbor 60 can readily be changed by removing nut 68 and a different diameter arbor 60 and member 67 can be substituted to make washers of different diameters. The exact position of the arbor with respect to anvil 78 can be adjusted by rotating sleeve 62 with respect to support 64 through a support and adjusting device 71 so that an exact spacing can be developed between the periphery of the arbor and the surface of the anvil to accommodate a given diameter lock washer made from a predetermined thickness of wire.

COILING DEVICE ADJUSTMENT

According to one aspect of the invention, arbor 60 and coil forming roll 70 are movable substantially universally relative to each other and are also movable universally as a unit with respect to cutting device 18 so that the coiling device can readily be adjusted to accommodate making washers all different diameters and at the same time accurately positioning the coiling device with respect to the cutting device to insure an accurate cut is made during removal of each revolution of the helical coil from the continuous supply of wire.

Referring to FIGS. 4 and 5, support 64 is secured to a plate 80 through securing means (not shown). Plate 80 is guided for movement along a path indicated by arrows 82 on a guide structure 84 that is supported for movement on platform 20 along a path generally indicated by arrows 86, which path is perpendicular to the path 82 for plate 80. Guide structure 84 consists of a lower plate 90 that has guide bars 92 extending along opposed parallel edges thereof that are releasably retained thereon by set screws 94. A further guide bar 96 overlaps each guide bar 92 and an edge portion of plate 80 and is releasably retained on base 90 through adjusting screws 98. Thus, support plate 80 can be moved in either direction along the path indicated by arrows 82 by loosening adjusting screws 98 and shifting the plate and the structure supported thereon towards and away from the cutting device to accurately position the edge of the cutting device, which will be described later, with respect to arbor 60, particularly recess 66.

Guide structure 84, support plate 80 and support 64 are likewise movable along the direction indicated by arrows 86. For this purpose, platform 20 has a pair of parallel guide bars 100 respectively extending along opposed edges of guide structure 84 and secured to platform 20 by screws 101. Three adjusting screws 102 extend through elongated slots 104 in plate 90 so that it is only necessary to release the three adjusting screws 102 and shift the entire guide structure 84 with the elements supported thereon in either direction along the arrows indicated by reference numeral 86.

Another adjustment that is necessary and desirable is the ability to move forming roll 70 with respect to the peripheral surface of arbor 60. This adjustment is made through a plurality of adjusting devices, which will now be described.

Movable support structure 74 includes a shaft structure 110 consisting of a first member 112 having an internally threaded opening 114 extending from one end thereof and being squared at the opposite end, as illustrated at 116 in FIG. 4. Shaft structure 110 includes a second member 120 that has an external thread which is threadedly received into threaded opening 114 in first member 112. Shaft structure also has an integral shoulder 122 intermediate opposite ends which is defined on the free end of first member 112.

A U-shaped clevice structure 130 is rotatably supported on the circular periphery of first member 112 and has one surface in engagement an adjacent surface of shoulder 122 and is releasably retained thereon by a nut 134. Clevice structure 130 consists of a collar 136 that surrounds shaft structure 110 and has an integral arm 138 extending therefrom. A second arm 140 cooperates with the first arm 138 to define a generally U-shaped opening in which forming roll is rotatably supported. Arm 140 is releasably retained on collar structure 136 through a plurality of screws 142. With the movable support structure so far described, the forming roll 70 can readily be assembled on structure 130 by initially removing arm 140 and then inserting one end of pin 72 into a bearing 146 fixed in an opening in first arm 138. Thereafter, the second arm 140 with a second identical bearing 138 can be telescoped over the free end of pin 72 and fixedly secured by screw 142. Suitable shims 144 may be utilized to provide the proper spacing between arms 138 and 140.

The entire support structure including shaft structure 110 and clevis structure 130 are adjustable along a path indicated by arrows 86 to vary the spacing between the peripheral surface of forming roll 70 and the adjacent peripheral surface of arbor 60. This is accomplished through an adjusting screw 150 having an intermediate portion rotatable on support 64 and threaded into an opening 151 defined in second member 120. Thus, screw 150 having a rectangular head 152 at one end thereof, can be rotated in either direction to move forming roll 70 towards and away in either direction to move forming roll 70 towards and away from arbor 60. During the movement, shaft structure 110 is guided by a flange 153 integral with member 120 and moved along an elongated slot 154 in support 64. After the forming roll has been properly adjusted with respect to arbor 60, a nut 156 can be tightened against a strap 157 and a set screw 158 threaded into an opening in clevis structure 130 can also be tightened into engagement with an opposed surface of support 64 to fixedly secure movable support 74 in a fixed position with respect to support 64.

In certain instances it may also be desirable to change the point of tangency between the forming roll 70 and the periphery of arbor 60. This is accomplished through a pair of set screws 160 and 162 (FIG. 4) respectively engaging upper and lower surfaces of clevis or bracket structure 130 with each screw having a lock nut 164 for retaining the respective screws in the adjusted position. Thus, if the axis of forming roll 70 is to be raised or lowered, it is only necessary to loosen lock nuts 164 and rotate the respective adjusting screws 160 and 162 in the appropriate direction to raise or lower the entire clevis structure 130 around its support shaft structure 110.

CUTTING DEVICE

The details of cutting device 18 are illustrated most clearly in FIG. 5 of the drawings. Cutting device 18 consists of an elongated shaft 200 that is supported on platform 20 through first and second space bearing blocks 202 (FIG. 1). Each bearing block 202 includes a lower member 204 (FIG. 5), an upper member 206 and end members 208. Members 204, 206 and 208 are bolted together through bolts 210 and each bearing block 202 supports a pair of roller bearing structures 212 which are most clearly illustrated in FIG. 5.

From an inspection of FIG. 5 it will be noted that the axis 220 of shaft 200 is angularly offset from the axis 222 of arbor 60 by a small acute angle which is preferably on the order of about 10° and shaft 200 is maintained in a fixed position with respect to platform 20 at all times.

The cutting device 18 also includes a cutting head 230 that is secured to one end of shaft 200 through a plurality of set screws 232. A cutter in the form of a rectangular member 234 is received into a opening 236 in cutter head 220 and opening 236 is located eccentrically of axis 220 for shaft 200. Cutter 234 is releasably retained in opening 236 through a pair of set screws (not shown).

Cutting device 18 also has a hand wheel 240 fixedly secured to shaft 200 through suitable means (not shown) so that the cutting head can be manually rotated for a purpose that will be described later. A brake band 242 is also fixedly secured to shaft 200 and has a solenoid operated braking device 244 associated therewith as will be described in more detail later.

DRIVE MECHANISM

According to a primary aspect of the present invention, the drive mechanism is designed such that the cutter head speed can be made infinitely variable and the feed speed of the feed rolls can be accurately correlated with the cutter head speed to allow introduction of an exact length of wire for each revolution of the cutter head to produce a precisely dimension washer having an accurately controlled inside diameter as well as an accurately controlled gap.

The drive mechanism is most clearly illustrated in FIG. 3 and includes an AC electric motor or drive means 310 that is supported on the side wall of housing 22 by brackets 312 and bolts 314. Drive motor 310 has a speed control mechanism 320 (FIG. 6) associated therewith so that the output speed of the drive motor is infinitely adjustable over a wide range of output speeds as will be described in more detail later. Speed control 320 and motor 310 are available as a commercial unit from Parametrics Division of Zero-Max Industries, Inc., Orange, Conn., which is sold as an AC motor adjustable speed control, Parajust B. Essentially the Parajust unit is a solid state controller which converts three phase 220 volt AC input power to an adjustable frequency, adjustable voltage for the AC motor. Thus, the speed is proportional to the frequency output of the Parajust or speed control and the motor produces a constant torque and draws constant current over the entire speed range.

The output shaft 322 of motor 310 has a drive pulley 324 secured thereto and drive pulley 324 is connected to a pulley 326 on cutter shaft 200 by a timing belt 328. Cutter shaft 200 also has a second pulley 330 secured thereto and pulley 330 is connected to an input shaft 332 of a variable speed transmission unit 334 through a further timing belt 336. Variable speed transmission unit 334 has an output shaft 340 with a pulley 342 secured thereto. Pulley 342 is connected to a pulley 344 fixed to the free end of idler shaft 42 through a further timing belt 346.

Transmission unit 334 is again preferably a commercial item sold as a Specon Vari-Chain, Model No. 34 transmission by the Industrial Products Division of FairChild Industries, Inc. This commercial transmission unit has a small reversible motor 350 incorporated therein which is capable of increasing and decreasing the pitch of a variable pulley (not shown) to infinitely vary the speed of output shaft 340 with respect to the speed of input shaft 332.

With the drive mechanism so far described, the speed of cutter shaft 200 is infinitely variable by the speed control unit 320 and provides the input drive to the variable speed transmission unit 334 so that the input speed of the transmission unit is accurately correlated with the speed of the cutter head. By increasing or decreasing the speed of the output shaft 340, the feed speed of the wire can be accurately controlled so that the operator is capable of introducing the exact length of wire required to produce a precisely dimensioned washer having a predetermined gap. Since the input for the variable speed transmission unit 334 is driven directly from cutter shaft 200, the cutter head speed controls the amount of wire that is introduced in a given time span and thereby insures perfect synchronization between the feed speed of the wire in relation to the speed of the cutter head.

After the speed of feed rolls 32, 34 has been properly adjusted, the speed of adjustable motor 310 can be increased and decreased and the speed of the feed rolls will remain synchronized with the speed of the cutter head to maintain a given lock washer diameter having a predetermined gap.

The operating speed of the cutter head and the ratio between the cutter head speed and the wire feed speed are preferably displayed on two digital read out units mounted on top of the electrical control console which houses the electrical circuit that will be described later. The relationship required for producing any given diameter lock washer from a material or wire having a predetermined thickness can accurately be predetermined by mathematical calculation and then the two digital read out units can be adjusted with respect to each through operation of electrical circuitry that will be described later so that the operator can readily change the diameter of the lock washer and/or the gap thereof by merely operating a plurality of control buttons to correlate the digital read outs for the transmission output and the cutter head speed.

COOLANT SYSTEM

The lock washer machine of the present invention also incorporates a coolant system for supplying coolant to the various wire guides (not shown) and also to the cutting area where the lock washers are cut from the helical coil. The coolant system consists of a tank 360 which defines a reservoir and has a coolant pump 362 associated therewith. Coolant pump 362 is driven by a coolant motor 364 so that coolant is withdrawn from the reservoir by pump 362 and is delivered to the appropriate area through conduits 366.

ELECTRICAL CIRCUIT

The electrical circuit for controlling the various functions described above is illustrated in FIGS. 6, 7A and 7B. In addition to controlling the appropriate functions, the electric circuit also has numerous safety features incorporated therein which are necessary or desirable for a unit of this size.

The electrical circuit includes a 220 volt, three phase, 60 Hz power supply connected to a first set of contacts 410 of a master switch 412. The second set of contacts 414 of switch 412 are connected through lines 416 to the respective motors 310, 350 and 360 with speed control 320 interposed between motor 310 and lines 416. Suitable fuses 418 may be interposed in each line 416. Two of the lines 416 are also connected to a transformer 420 which converts the 220 volt supply to a 110 volt AC supply for the remainder of the control circuit that will now be described.

The control circuit for controlling the various motors and other electrical components is illustrated in FIGS. 7A and 7B and includes a 110 volt source emminating as an output from transformer 420 to a pair of input lines 422. A pair of switches 424 and a fuse 426 are located between lines 422 and switches 424 are interlock switches between the front and rear doors (not shown) for housing 22. Thus, lines 422 can only be energized when the respective doors are closed to provide a safety precaution for any operator.

The electrical circuit includes a master on-off switch 430 in a line 432 between lines 422 which has normally closed overload contacts 434 of overload mechanism 436 (FIG. 6) located in the power supply to the speed control unit 320. Line 432 also has a power relay 436 in parallel with an indicator relay 438. Power relay 436 has a set of normally open contacts 440 (FIG. 6) in lines 416 leading to the speed control unit 320 and contacts 440 are closed when relay 436 is energized to supply power to the speed control unit. Indicator relay 438 has a set of normally open contacts 442 located in one line 422 and contacts 442 are closed when relay 438 is energized which in turn energizes an indicator light 446. This indicator light is located on the control console and gives a visual indication to the operator that the power to the control circuit is on.

The electric control circuit also includes a mode of operation selector means. This selector means is illustrated in FIG. 7A and includes a three position selection mode switch 450 having a pair of switch arms 452 and 454 located in two lines 456 and 458 between power lines 422. Switch 450 has a further pair of switch arms 460 and 462 respectively located in a brake circuit 464 and coolant motor circuit 466. Switch 450 is a three position switch which allows the operator to select anyone of three modes of operation, namely "hand," "jog" or "continuous" running of the system.

Power line 456 has a control relay 470 having a first pair of normally open contacts 472 in series therewith, a second set of normally open contacts 474 incorporated in the circuit for speed control unit 320 and a third set of normally open contacts 476 (FIG. 7B) located in a lubricating circuit 480 that will be described later. Relay 470 also has a set of normally closed contacts 478 located in braking circuit 464. With the circuit so far described, closure of control switch 430 will simultaneoulsy energize relays 436 and 438. Energizing relay 436 will close the normally open contacts 440 in the power lines leading to speed control unit 320 while control relay 438 closes contacts 442 in main line 422 to supply power to the remainder of the control circuit.

Assuming main switch 450 is in the position illustrated in FIGS. 7A and 7B, switch arms 452, 454, 460 and 462 are in the open condition and the mode circuit is thus in a position for "hand" operation of the cutter head. In this position, the "jog" and "run" circuits are open because switch arms 452 and 454 are open. Likewise, the coolant motor circuit 466 is deenergized because switch arm 462 is open while brake solenoid 506 is deenergized to release the brake 244. In this position, the operator can manually grasp hand wheel 240 and rotate the wheel to manually rotate the cutting head. Manual rotation of the cutting head will also be transmitted through the transmission unit through the feed rolls 32, 34 and will rotate the feed rolls accordingly. This mode of operation is used to set the tools and the cutter timer to be described later.

Assuming now the operator wishes to change the mode of operation to the "jog" mode, mode position switch 450 is moved to an intermediate position wherein switch arms 454, 460 and 462 are closed. Closure of switch arm 462 (FIG. 7B) will energize coolant motor relay 510 in coolant motor circuit 466 which closes contacts 516 (FIG. 6). Closure of contacts 516 energizes the coolant motor 360 which will then by supplying coolant fluid to the various guides and the cutting area. However, at this time the machine is still not operational because two jog switches 482 in line 458 remain open which precludes energizing control relay 470.

If both jog switches 482 are then closed manually, the circuit will be completed to control relay 470 which will close normally opened contacts 472. Energizing control relay 470 also closes normally open contacts 474 located in the speed control unit 320 so that motor 310 becomes energized. Energizing control relay 470 will also close contacts 476 to energize the lubricant circuit and open closed contacts 478 to release brake 244. Thus, whenever both jog switches 482 are closed, the machine will be operating at a predetermined set speed to be discussed below. However, both switches 482, which are preferably spring biased to an open condition, must be closed in order to complete this circuit.

With the circuit in the "jog" mode of operation, the operator can maintain one of the job switches 482 in the closed position and temporarily press the second switch so that the machine will be operating at very short intervals to check the tool cutter timing setting in relation to the remaining functions.

As indicated above, lubricant circuit 480 is likewise energized since contacts 476 are closed. Energizing lubricant circuit 480 energizes a lube time delay relay 520 which has a set of normally open contacts 522 in series with a lube solenoid 524 associated with a lube motor (not shown). Closure of relay contacts 522 energizes solenoid 524 for a predetermined set time period during which the various components of the machine are automatically lubricated. When the time for time delay relay has expired, contacts 522 are opened and the lube solenoid 524 becomes deenergized. Thus, the lubricant is supplied to various components, particularly bearings 212, each time the circuit is energized.

Assuming now the operator wishes to condition the machine for continuous operation, mode switch 450 is moved to a third position wherein switch arms 462, 460 and 452 are closed while switch arm 454 is open. Switch arm 462 energizes coolant motor relay 510 to close coolant motor contacts 516. Closure of switch arm 452 supplies power to one of the contacts of the two sets of contacts 486 of run switches 484 so that when both switches 484 are closed, control relay 470 will be energized which in turn energizes the speed control unit 320, closes contacts 472 so that control relay 470 will remain energized through line 456 and also deenergize brake solenoid 506 to release brake 244 and energizes lube time delay relay 520 to temporarily energize lube solenoid 524.

It should be noted at this point the mode selector circuit also incorporates a safety circuit which requires the operator to close both run switches within a given time span or the run circuit cannot be energized. This prevents having one run switch closed for a period of time and then inadvertently closing the second switch when the machine is not intended to be operated in the run cycle. Stated another way, both run switches must be closed in a short time span to complete the run circuit.

The safety circuit includes a time delay relay 490 that is energized by either of two parallel circuits 492 and 494. Circuit 492 has a set of normally open contacts 496 forming part of first run switch 484 while the second circuit 494 has a pair of normally open contacts 498 with the second run switch 484.

Thus, whenever either one of the two run or continuous operation switches 484 is closed, either circuit 494 or 494 will energize time delay relay 490. If both switches 484 are not closed within the time set within the time delay relay 490, such as a period of 3 to 5 seconds, time delay relay 490 will time out and close normally opened contacts 491 to energize delay relay 500 and open the contacts 502 in the run circuit and thereby prevent energizing control relay 470.

Assuming that control relay 470 has been energized and the motor 310 is operating at a predetermined speed, all of the control functions will be operating as described above and the cutter head speed will be operating at a predetermined speed while the feed rolls will likewise be driven at a predetermined speed. If the operator now wishes to increase or decrease the speed of operation, it is only necessary for the operator to rotate a control wheel which is connected to a rheostat (not shown) incorporated into the speed control unit 320 and the speed of motor 310 can be increased or decreased accordingly. This speed can be displayed on the digital readout discussed above. Of course, increasing or decreasing the speed of motor 310 will simultaneously vary the speed of the cutter head as well as the feed rolls.

Considering now the most significant feature of the present invention, which is the synchronization of the feed roll speed with the cutter head speed. Referring to FIGS. 6 and 7b, the cutter head speed is set at a predetermined speed which has previously been calculated by adjusting the rheostat (not shown) and the speed is displayed on the digital read out. Once the predetermined speed has been set, the speed of the feed rolls can be increased or decreased by the circuit illustrated in the lowermost portion of FIG. 7b and generally be designated by reference numeral 540.

This circuit includes a first or "increase" two position switch 542 in series with a second or "decrease" two position switch 544. A first contact 546 of switch 542 is connected to a main power supply line 422 while a second contact 548 is connected to a first contact 550 of the second switch 544. The second contact 552 of switch 544 is connected to a relay 554 which in turn is connected to power line 422 through a plurality of normally closed contacts 556 that will be described later. Contact 560 of switch 544 is connected to one power line 422 while a further contact 562 is connected to a contact 564 of switch 542. The remaining contact 566 of switch 542 in turn is connected to a relay 568 which is again connected to the second power line through normally closed contacts 556. Normally closed contacts 536 are associated with heat sensitive relays (not shown) in the lines leading to motor 350 and will be opened when the temperature reaches a certain level to prevent destruction of the motor.

The remainder of the control circuit for increasing and decreasing the feed speed is illustrated in FIG. 6 and includes two separate circuits leading from two power lines 416 to opposite sides of motor 350 which has its field coil winding 570 in series therewith. The first or increase speed relay 568 has three sets of contacts 572 respectively located in lines 574, 576 and 578. Likewise, the decrease speed relay 554 has three sets of normally opened contacts 580 respectively located in lines 58, 582 and 584.

Assuming now the operator wishes to increase the speed of the feed rolls in relation to the speed of the cutter head, switch 542 is moved to a second position to interconnect contacts 564 and 566. In this position, the circuit is completed to relay 568 through closed contacts 560, 562, 564 and 566 and contacts 572 will be closed. The closure of contacts 572 will complete a circuit between the two lines 416 through line 574, field coil winding 570, and lines 578, 576 and 58. Motor 350 will adjust the variable speed transmission, by means such as adjusting the pitch of the pulleys (not shown) within the transmission, thereby increasing the output speed in relation to the input speed of the transmission unit. When the desired setting is reached, which again is indicated on the digital readout, switch 542 is released and the speed of the feed rolls will then be synchronized with the speed of the cutting head.

A decrease in speed is accomplished by moving switch 544 to the second position to complete the circuit to relay 554 through contacts 546, 548, 550 and 552 of the respective switches which again adjusts the pitch of the pulleys (not shown) in the transmission unit thereby decreasing the output speed. It should be pointed out at this time that because the respective switches are interconnected in series with each other, it is impossible to simultaneously energize both relays 554 and 568.

While not absolutely essential to practicing the invention, the electrical circuit also incorporates numerous additional safety features which are desirable to prevent distruction of the machine or injury to the operator. One of the safety features incorporated into the electric circuit is a detection system for detecting a jam in the chute through which the finished washers pass after being cut from the continuous coil and a second device which detects an interruption in the cut. The entire machine is automatically shut down when either such conditions occur.

For this purpose, the electric circuit includes a sensor circuit 600 including a transistor sensitive relay sensing device 602 interposed between power lines 422. Sensing relay 602 is grounded through a line 604 and also has two lines 606 and 608 respectively leading therefrom to an area adjacent a chute (not shown), designated as 610 in the circuit diagram. The cut interrrput sensing line 608 leads to an appropriate location identified as 612 to sense an interruption in the cut of the helical coil. Thus, whenever the chute jams or the cut is interrupted, the respective sensors 610 and 612 will be grounded to energize sensing relay 602. Sensing relay 602 has a pair of normally closed contacts 614 in main line 456 of the mode selection circuit so that the entire circuit becomes deenergized at any time the sensing relay 602 is energized. This will automatically shut off the entire machine.

The sensing relay 602 also has a second set of normally opened contacts 616 in series with an indicator light 618 so that indicator light 618 is energized whenever the sensing relay is energized to indicate the reason for the shutdown.

The electric circuit also includes an indicating means for indicating when the end of a coil of wire approaches the feed rolls to prevent the machine from being operated without any wire being fed to the coiling device. This control means includes a normally open switch 620 (FIG. 7b) located in series with a relay 622 that has a set of normally open contacts 624 in series with an indicator light 626. The end of material relay 622 also has a set of normally closed contacts 628 in main power line 456 supplying power to the mode circuit. Thus, if the end of the material moves past switch 620, the switch is automatically closed to energize relay 622 which in turn closes contacts 624 to energize indicator light 626 and simultaneously opens contacts 628 to shut down the machine.

The electric circuit also incorporates a detection system for detecting when the reservoir or tank has insufficient coolant therein to provide the necessary cooling functions for the various operations. The circuit for indicating the level of cooling in the reservoir is illustrated in FIG. 7b includes a normally open switch 630 in series with a coolant relay 632 which has a set of normally open contacts 634 in series with an indicator light 636 as well as a set of normally closed contacts 638 (FIG. 7a) in main power line 456. Switch 630 may be associated with a float within reservoir which will automatically close when the level in the reservoir reaches a predetermined low level. When this occurs, switch 630 will close to energize relay 632 which will close contacts 634 to energize light 636 and will open contacts 638 and shut down the entire machine.

As a further precaution, a master stop switch 640 (FIG. 7a) is also located in main line 456 and is located at a convenient position to the operator so that the switch can automatically be actuated and interrupt the power to the machine.

SUMMARY

As can be appreciated from the above description, the present invention provides an extremely simple machine which is capable of being accurately controlled to produce washers of varying diameter with a varying gap all of which can be accomplished in a minimum period of time by even an unskilled operator.

It is only necessary for an operator to select an arbor having an appropriate diameter to produce a lock washer of a given diameter and adjust the peripheral spacing with respect to the surface of the anvil to accommodate the size of wire being used. The position of the arbor and the cut-out in the arbor can then be accurately positioned by the adjustments described above.

The operator can then correlate the feed speed of the feed rolls with the cutter head speed by pushing buttons and reading numbers on the digital readout units on the control console. After this setting has been made, the operator can increase or decrease the cutter head speed and the feed speed for the wire will remain correlated to produce the same washer.

Thus, a change-over from one diameter washer to another can be accomplished in a short period of time and the quality of washer, particularly the gap, can be accurately controlled.

We claim:

1. A method of producing split ring lock washers from an endless supply of wire which includes continuously feeding said wire towards a coiling device to transform said wire into a helical coil and separating successive end convolutions of said coil by a continuously rotating cutter, the improvement of coordinating the feed speed of said wire with the rotational speed of said cutter for a given lock washer diameter, varying the rotational speed of said cutter while maintaining a synchronized relation between said feed speed and said cutter speed to maintain said given lock washer diameter, said cutter being rotated by a variable speed motor, said feed speed of said wire being varied by a transmission unit driven by said motor, said cutter being rotated about a fixed axis which is angularly offset from an axis of said helical coil by an angle less than 90 degrees, said coiling device including a coil forming roll and a fixed arbor defining the axis for said helical coil with the cutter axis being angularly offset less than 45 degrees, and moving the axis of said arbor axially and transversely to adjust the position of said arbor with respect to the fixed axis of said cutter while maintaining the angular offset.

2. A method as defined in claim 1 including replacing said arbor with an arbor having a different diameter to vary the inside diameter of said split ring lock washers.

3. A method as defined in claim 2 including movably adjusting said coiling device relative to said wire cutter to accommodate said different diameter split ring lock washers.

4. A method as defined in claim 2 including movably adjusting the positioning of said coil forming roll relative to said arbor to accommodate said differet diameter split ring lock washers.

5. A method as defined in claim 4 including changing the point of tangency between said coil forming roll and arbor.

6. A method as defined in claim 1, in which said wire cutter is driven directly by said motor and said transmission has an input driven by said motor and an output for varying said feed speed of said wire in response to said varied speed of said wire cutter.

7. A method as defined in claim 6, in which said wire is fed by at least one pair of cooperating gripping rolls and in which one of said rolls is driven directly by the output of said transmission and the second of said rolls is positively driven by the first roll.

8. Apparatus for forming lock washers comprising coiling means for forming a helical coil from a wire stock, feed means for feeding said wire stock, cutter means for severing end convolutions from said helical coil, and drive means for driving said feed means and said cutter means, the improvement of said drive means including motor means having a driving connection with said cutter means, variable transmission means between said motor means and said feed means so that the speed of said feed means can be correlated with said cutter means to produce lock washers of various diameters, said coiling device including an arbor having an arbor axis defining a small acute angle with respect to said fixed axis and adjustment means for adjusting said coiling device axial of and perpendicular to said arbor axis while maintaining said small acute angle.

9. Apparatus as defined in claim 8 further including an electric circuit for driving said drive means, said electric circuit including mode selector means for conditioning said circuit for (1) continuous operation, (2) intermittent and (3) manual operation of said wire cutter means and said feed means.

10. Apparatus as defined in claim 9, in which said electric circuit includes first and second means for actuating said circuit for continuous operation, and time delay means cooperating with said first and second means for preventing activation of said circuit for a predetermined time period after one means is operated without operating the other means.

11. Apparatus as defined in claim 9, in which said variable speed transmission means includes a reversible electric motor and said electric circuit includes a first circuit for operating said reversible electric motor to increase the speed of said feed means and a second means for operating said reversible electric motor to decrease the speed of said feed means and cooperating means in said first and second circuits preventing simultaneous energization of both circuits.

12. Apparatus as defined in claim 8 wherein said wire is keystone shaped in cross section and said feed means includes first and second drive rolls having tapered surfaces for engaging said wire.

13. Apparatus as defined in claim 12 wherein each of said drive rolls has double tapered surfaces for increasing the useful life of said drive rolls.

14. Apparatus as defined in claim 8 including a tubular member for receiving said arbor and a sleeve having an eccentric opening for receiving said tubular member.

15. Apparatus as defined in claim 8 further including means for movably adjusting said coiling device relative to said wire cutter means.

16. Apparatus as defined in claim 8 further including means for movably adjusting said coil forming roll relative to said arbor.

17. A method of forming lock washers comprising the steps of: forming a helical coil from wire stock with a coiling device having an arbor, feeding said wire stock to said coiling device with feed means, severing end convolutions from said helical coil with a cutter rotating about a fixed axis, driving said feed means and said cutter with a motor having a driving connection with said cutter, correlating the speed of feeding said wire stock to said coiling device with the speed of severing the end convolutions from said helical coil by means of a variable transmission positioned between said motor means and said feed means to produce lock washers of various diameters, positioning the axis of said arbor at a small acute angle with respect to said fixed axis of said cutter and adjusting said coiling device axially of and perpendicular to the axis of said arbor while maintaining said small acute angle.

* * * * *